United States Patent [19]
Hall et al.

[11] Patent Number: 5,518,340
[45] Date of Patent: May 21, 1996

[54] PIPE SUPPORT FRAME

[75] Inventors: N. Victor Hall, Houston, Tex.; Peter Rash, Anglesea, Australia

[73] Assignee: Sonsub International Management, Inc., Houston, Tex.

[21] Appl. No.: 54,727

[22] Filed: Apr. 29, 1993

[51] Int. Cl.$^6$ ...................................................... F16L 1/00
[52] U.S. Cl. .............................. 405/158; 405/172; 138/97
[58] Field of Search .................................... 405/154, 158, 405/159, 171, 172, 173; 285/31, 32; 138/97

[56] References Cited

U.S. PATENT DOCUMENTS

| | | | |
|---|---|---|---|
| 3,656,309 | 4/1972 | Bultema. | |
| 3,853,182 | 12/1974 | Bourne et al. | 405/154 X |
| 3,861,158 | 1/1975 | Swain et al. | 405/172 |
| 4,109,480 | 8/1978 | Sumner | 405/173 |
| 4,218,158 | 8/1980 | Tesson | 405/158 X |
| 4,252,466 | 2/1981 | Bertl et al. | 405/172 |
| 4,253,779 | 3/1981 | Grognu | 405/169 |
| 4,363,569 | 12/1982 | Scodino et al. | 405/303 |
| 4,389,034 | 6/1983 | Suttles | 405/172 X |
| 4,443,129 | 4/1984 | De Sivry et al. | 405/170 |
| 4,445,804 | 5/1984 | Abdallah et al. | 405/173 |
| 4,832,530 | 5/1989 | Andersen et al. | 405/170 |
| 5,044,827 | 9/1991 | Gray et al. | 405/173 |
| 5,201,610 | 4/1993 | Mansfield et al. | 405/172 |

FOREIGN PATENT DOCUMENTS

| | | | |
|---|---|---|---|
| 2536826 | 6/1984 | France | 405/172 |
| 1099171 | 6/1984 | U.S.S.R. | 405/158 |
| 2015115 | 9/1979 | United Kingdom | 405/158 |
| 2187436 | 12/1989 | United Kingdom. | |

OTHER PUBLICATIONS

"Remote Operated Placing System," published by Canflex Manufacturing, Inc., West Vancouver, B.C., Canada (4 pages, no date).
"Your Partner Offshore for Fabric Formwork and Grouting," published by Canflex Manufacturing, Inc., West Vancouver, B.C., Canada (5 pages, no date).
"Fabric Formwork Grouting Offshore," published by Canflex Manufacturing, Inc., West Vancouver, B.C., Canada (10 pages (excerpted), no date).
"Style '88' Pipeline Grout Support Bags," published by Canflex Manufacturing, Inc., West Vancouver, B.C., Canada (14 pages, (excerpted), no date).
"General Information on Pipeline Stabilization and Protection," published by Wimpey Geotech Limited, Hayes, Middlesex, England (10 pages (excerpted), no date).
Sonsub International Management Inc. compilation of two pieces of prior art pipe support equipment included in report entitled "Design Study Diverless Pipeline Repair System Report For Saipem," Nov. 8, 1991, 2 pages.
Sonsub International Management Inc. compilation of Sonsub conceptual drawings of pipe support equipment included in report entitled "Design Study Diverless Pipeline Repair System Report For Saipem," Nov. 8, 1991, 12 pages.
N. V. Hall and Mauro Brambilla, Deepwater Pipeline Repair Utilizing Advanced Remotely Operated Worksystems, 1993, 17 pages.

*Primary Examiner*—Eric K. Nicholson
*Attorney, Agent, or Firm*—Pravel, Hewitt, Kimball & Krieger

[57] ABSTRACT

A pipe support frame for positioning a subsea pipeline. The support frame includes lower and upper skids which are maintained in vertical alignment with one another. The lower skid includes vertical lower skid members and the upper skid includes mating vertical upper skid members which slidably engage the vertical lower skid members and maintain vertical alignment. Water jacking bags are positioned between the upper and lower skids to alter the elevation of the upper skid. The upper skid includes a pair of parallel beams. A trolley assembly is movably mounted to the pair of parallel beams to adjust the lateral position of the pipeline. A saddle for receiving the pipeline is attached to the trolley assembly. A threaded drive rod is rotatably mounted between the pair of parallel beams. The threaded drive rod is threadably engaged with the trolley assembly such that the lateral position of the trolley assembly is controllable by manipulating the threaded drive rod.

18 Claims, 9 Drawing Sheets

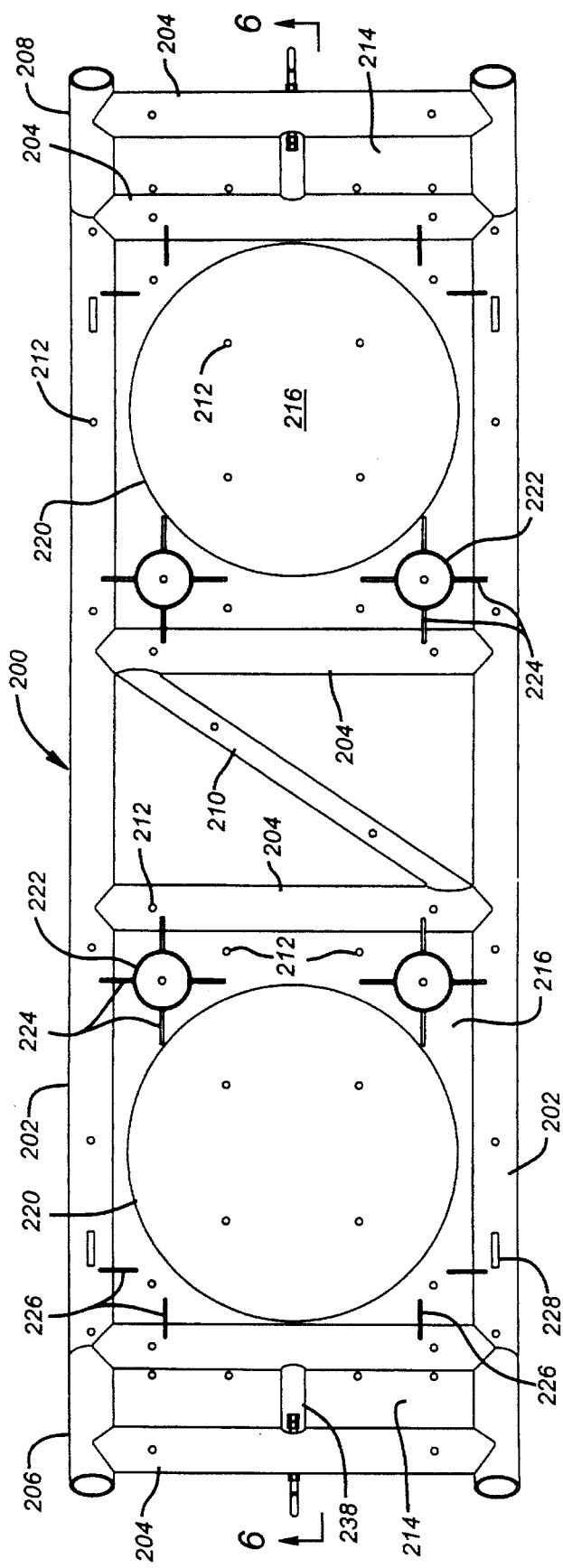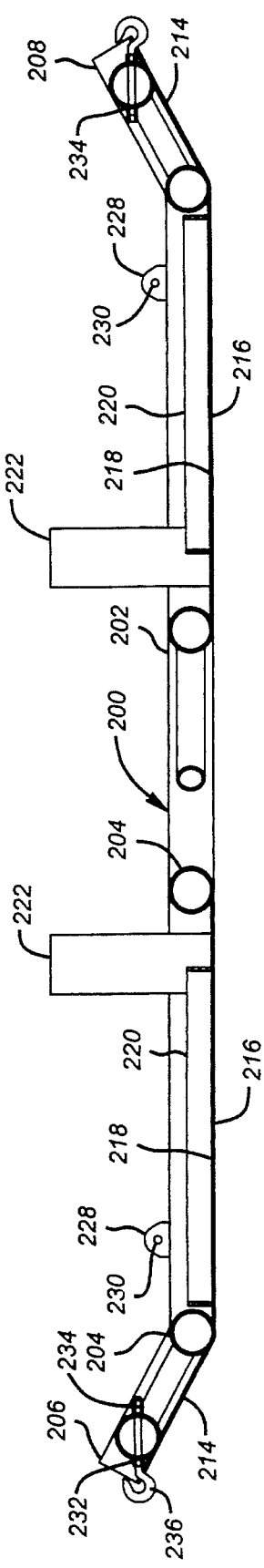

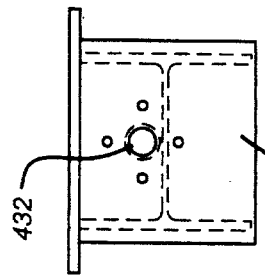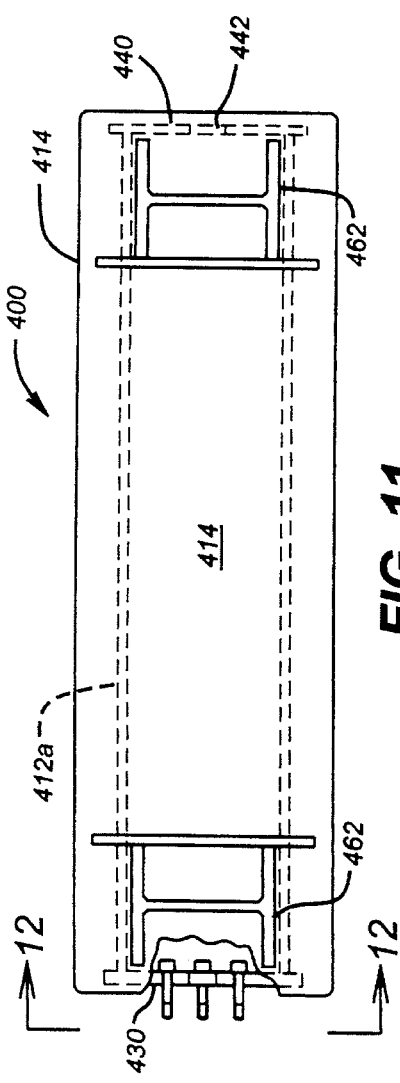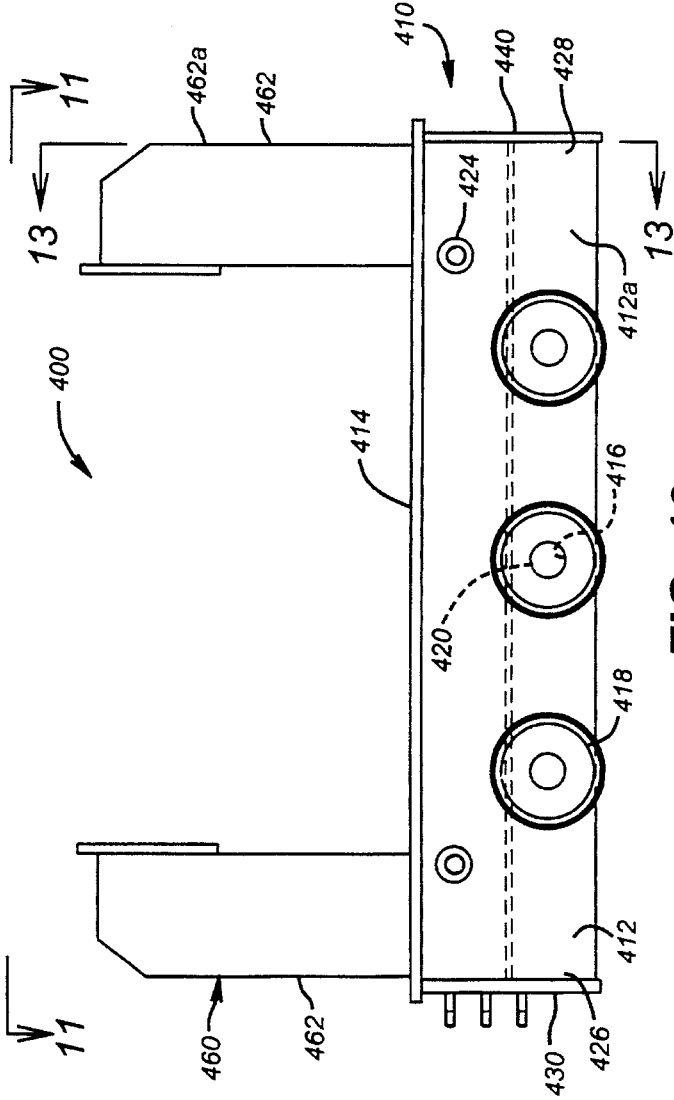

PIPE SUPPORT FRAME

BACKGROUND OF THE INVENTION

1. Field of the Invention.

The present invention relates to a pipe support frame for supporting subsea pipelines on the seabed.

2. Description of the Prior Art.

There are thousands of miles of pipelines laying on the seabed. Pipe laying technology permits pipelines to be laid in extremely shallow water depths to water depths of thousands of feet. A serious problem results when a subsea pipeline in deep water is damaged and in need of repair. A few examples of how a subsea pipeline can be damaged are by an object impacting the pipeline, an anchor dragging across the pipeline, or corrosion.

Typically, to repair a damaged submerged pipeline in the past, a couple of repair methods were available. One repair method required the damaged section of the pipeline to be recovered to the water surface and the necessary repairs were conducted on the deck of a vessel. After the repair was made the pipeline was lowered and repositioned on the seabed. This method was generally limited to small diameter pipelines in relatively shallow water. A second method involved conducting the repair in situ by divers, using either repair clamps or hyperbaric welding techniques. This method had also limitations related to water depth and pipeline size.

It is known to use a remotely operated vehicle (ROV) in deep water to sever and recover a submerged pipeline. U.S. Pat. No. 5,044,827 to Gray et al. discloses a method for severing and recovering a submerged pipeline. The ROV jets beneath a portion of the pipeline and then a deflated lift bag is lowered to the submerged pipeline. The deflated lift bag is positioned under the submerged pipeline and then inflated until a section of the pipeline has been raised off of the seabed. A cut-off saw is lowered to the raised section of the pipeline. The cut-off saw is clamped to the pipeline prior to severing the pipeline. The cut-off saw is then removed from the severed pipeline. A recovery head is lowered to the raised end of the severed pipeline and after alignment is placed in the raised end of the severed pipeline. The recovery head is activated to establish a gripping relationship with the pipeline. A recovery cable is lowered and connected to the recovery head. The recovery cable is retrieved to recover the recovery head and the pipeline to the water surface.

As the offshore pipeline industry continues to venture into deeper and deeper waters, more and more pipelines of increasing diameter are being laid in water depths beyond the range of divers. Due to a variety of factors such as pipeline size, seabed bearing capacity, sea currents, and lay barge daily rates, a reliable and dependable method for repairing submerged pipelines without retrieval to the water surface is needed. The method should minimize the amount of handling of the damaged pipeline. Furthermore, the method of repairing the pipeline should minimize costs and dependency on vessel motions due to sea conditions, such as heave, roll, or pitch, which can result in a significant amount of standby time and cost.

It is desirable to have a pipe support frame which can support a length of pipeline a nominal distance above the seabed to allow the subsea removal and replacement of a damaged section of the pipeline. It is further desirable to be able to adjust the elevation of the pipeline while in the pipe support frame and also to laterally alter the position of the pipeline ends to align and repair the subsea pipeline with a replacement section. Furthermore, the operations should all be possible with the use of an ROV.

SUMMARY OF THE INVENTION

The present invention is a pipe support frame which supports a subsea pipeline and allows elevational and lateral positioning of the pipeline during repair at the seafloor.

The pipe support frame includes lower and upper skids which are maintained in vertical relationship with one another. The lower skid includes vertical lower skid members and the upper skid includes mating vertical upper skid members which slidably engage the vertical lower skid members and maintain vertical alignment. Water jacking bags are positioned between the upper and lower skids to alter the elevation of the upper skid.

The upper skid includes a pair of parallel beams. A trolley assembly is movably mounted to the pair of parallel beams to adjust the lateral position of the pipeline. A pair of removable saddle supports for receiving the pipeline is attached to the trolley assembly. A threaded drive rod is rotatably mounted between the pair of parallel beams. The threaded drive rod is threadably engaged with the trolley assembly such that the lateral position of the trolley assembly is controllable by manipulating the threaded drive rod. The trolley assembly includes a locking assembly to lock the trolley assembly once the pipeline is properly positioned.

BRIEF DESCRIPTION OF THE DRAWINGS

The objects, advantages, and features of the invention will become more apparent by reference to the drawings which are appended hereto and wherein like numerals indicate like parts and wherein an illustrated embodiment of the invention is shown, in which:

FIG. 5 is a view taken along line 5—5 of FIG. 2 showing the lower skid;

FIG. 6 is a view taken along line 6—6 of FIG. 5;

FIG. 10 is a side elevation view of the pipe saddle assembly and trolley arrangement;

FIG. 11 is a view taken along line 11—11 of FIG. 10;

FIG. 12 is a view taken along line 12—12 of FIG. 11;

FIG. 13 is a view taken along line 13—13 of FIG. 10;

DETAILED DESCRIPTION OF PREFERRED EMBODIMENT

Figure 3:
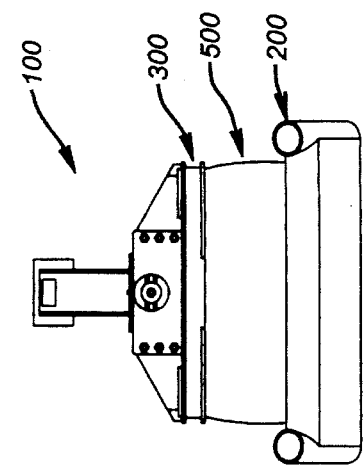
FIG. 3 is a view taken along line 3—3 of FIG. 2.
Figure 4:
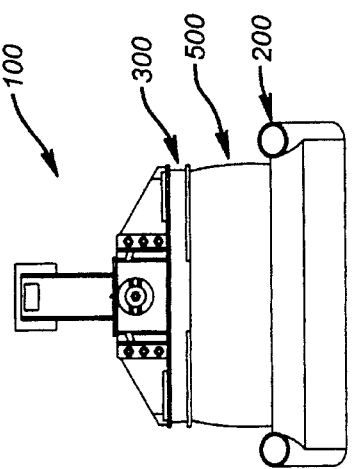
FIG. 4 is a view taken along line 4—4 of FIG. 2.

The pipe support frame, designated generally as 100, is generally shown in FIGS. 1, 2, 3, and 4. The pipe support frame 100 includes a lower skid 200, an upper skid 300, a pipe saddle assembly and trolley arrangement 400, and a pipe lifting assembly 500.

Referring to FIGS. 5 and 6, the lower skid 200 will be explained in detail. The lower skid 200 includes a pair of tubular skid members 202 which are maintained in parallel relationship by a plurality of tubular cross members 204. As shown in FIG. 6, the skid members 202 have upturned ends 206 and 208 which are angled upwardly. A diagonal cross member 210 is attached to the pair of centermost cross members 204 to provide added structural integrity to the lower skid 200. It is to be understood that the skid members 202, 204, and 210 are tubular members which are preferably welded to one another. The skid members 202, 204, and 210 include holes 212 in the tubular members to flood and drain the tubular members. It is desirable to flood the tubular members of the pipe support frame 100 during use to eliminate the buoyant forces of a sealed tubular pipe. However, when maneuvering the pipe support frame 100 in air, it is desirable to have the pipes drained to thus minimize the weight of the pipe support frame 100.

Referring to FIG. 6, a pair of end base plates 214 are welded to the underside of the upturned ends 206 and 208 of the tubular skid members 202 and the end cross members 204. A pair of interior base plates 216 is welded to the underside of the skid members 202 and interior cross members 204. The end base plates 214 and the interior base plates 216 include holes 212 for draining any water contained on the upper surface of the base plates 214 and 216. The base plates 214 and 216 facilitate the sliding of the pipe support frame 100 under the pipeline and also provide a large bearing surface area on the seabed to prevent the sinking of the pipe support frame 100 into the soft seabed when supporting the pipeline as will be explained below. Large suction forces develop when objects sink into the seabed making it very difficult to recover the object. Referring to FIGS. 5 and 6, attached to the upper surface 218 of the interior base plates 216 are a pair of cylindrical skirts 220. The cylindrical skirts 220 are preferably welded to the interior base plates 216. A pair of vertical posts 222 extend upwardly from the upper surface 218 of the interior base plates 216. Referring to FIG. 5, the vertical posts 222 are reinforced with a plurality of gusset plates 224 which are welded to the vertical posts 222 and to the interior base plates 216, the tubular members 202, and the cross members 204. Additionally, gusset plates 226 are provided to reinforce the interior base plate 216 with the tubular members 204 and 202.

Referring to FIGS. 5 and 6, a plurality of lifting eyes 228 are welded to the skid members 202 for lifting and lowering the pipe support frame 100. Each lifting eye 228 includes a hole 230 for receiving a pin (not shown) of a shackle (not shown) connected to a sling (not shown).

Referring to FIG. 6, the end cross members 204 include a centrally located hole 232 for receiving an end portion 234 of a hook 236. The hook 236 is securely fastened to the end cross member 204. The hook 236 is used to pull the pipe support frame 100 along the seabed. A reinforcing tubular member 238 is welded to the pair of end cross members 204 in alignment with the hook 236 for skid reinforcement purposes.

Figure 7:
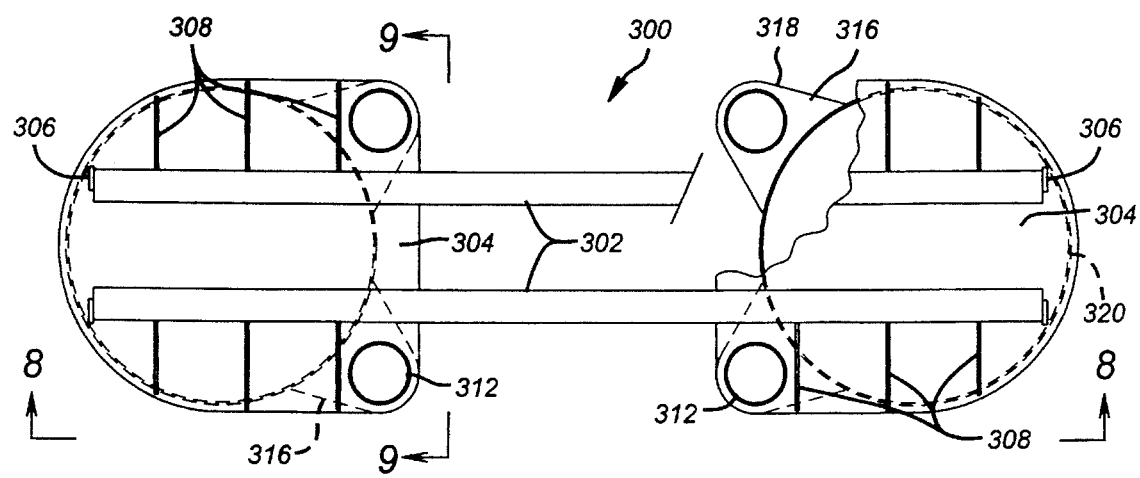
FIG. 7 is a top plan view of the upper skid.
Figure 8:
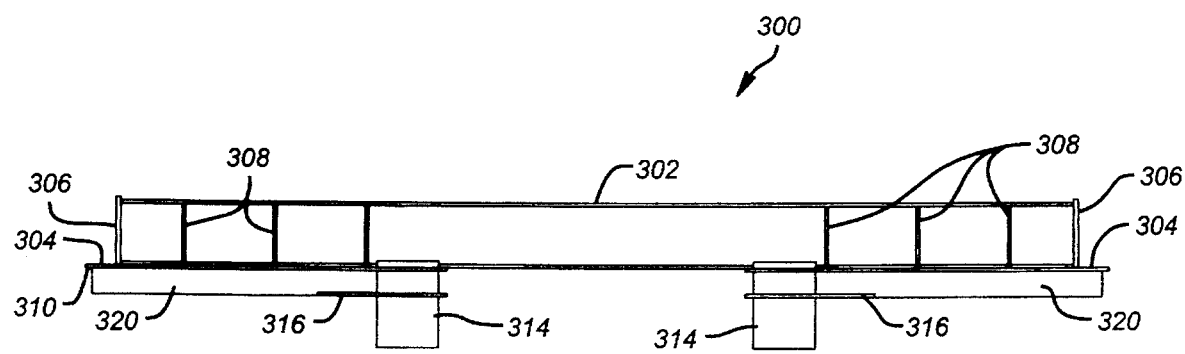
FIG. 8 is a view taken along line 8—8 of FIG. 7.
Figure 9:
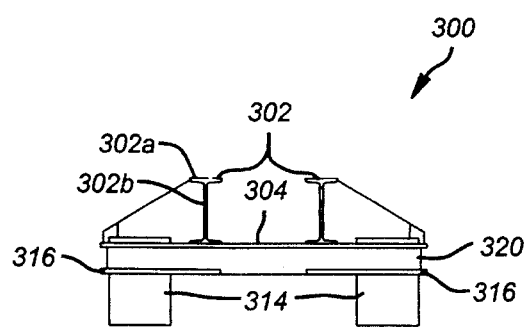
FIG. 9 is a view taken along line 9—9 of FIG. 7.

Referring to FIGS. 7, 8, and 9, the upper skid 300 will now be described in detail. The upper skid 300 includes a pair of parallel beams 302. It is to be understood that various structural shapes of beams may be used in the upper skid 300. In the preferred embodiment, a structural shape designated as an S shape by the American Institute of Steel Construction, Inc. (AISC) is used for reasons which will be explained below. The beams 302 are welded to a pair of cap plates 304. At the end of each beam 302, an end plate 306 is welded to the flanges 302a and web 302b of the beam 302. As shown in FIGS. 7 and 8, the end plate 306 is a rectangular plate having a height slightly greater than the height of the beam 302. A plurality of stiffener plates 308 are welded to the cap plate 304 and to the beam 302. A lower surface 310 of the cap plates 304 is welded to a cylindrical skirt 320 which corresponds with the cylindrical skirt 220 of the lower skid 200.

Each of the cap plates 304 includes a pair of holes 312 for receiving a tubular mating post 314. The tubular mating posts 314 extend through the hole 312 in the cap plate 304 and are welded to the cap plate 304. A stabilizing plate 316 having an opening 318 to receive the tubular mating post 314 is welded to the tubular mating post 314. The stabilizing plate 316 has an arcuate edge which abuts the cylindrical skirt 320 and is welded thereto.

Figure 2:
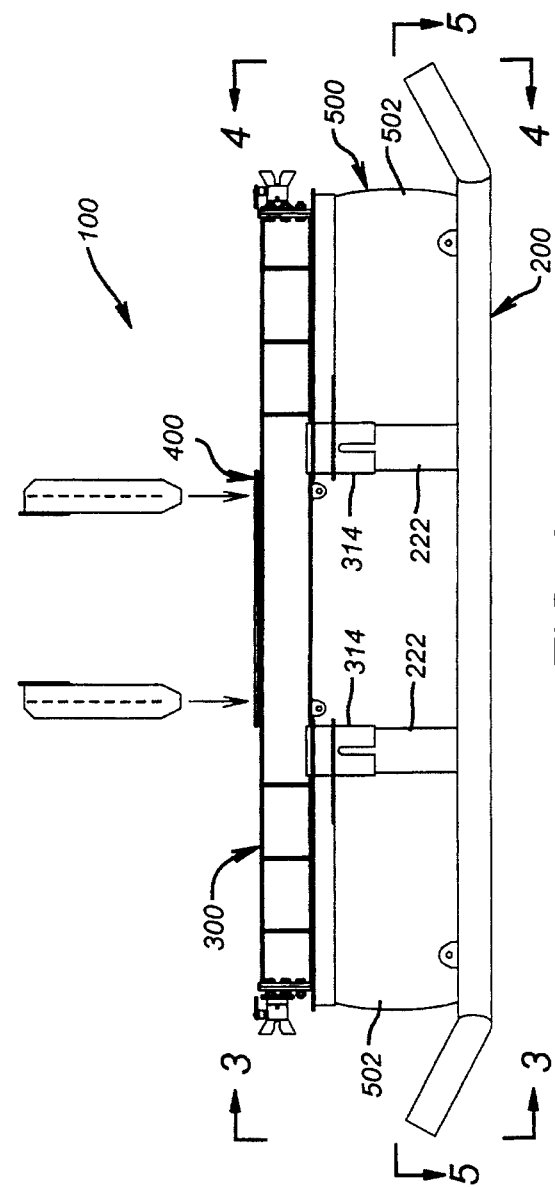
FIG. 2 is a side elevation view showing the pipe saddle assembly being lowered into position on the trolley arrangement.

It is important to note that the longitudinal spacing and the transverse spacing of the mating posts 314 corresponds to the longitudinal spacing and transverse spacing of the vertical posts 222 of the lower skid 200. As shown in FIG. 2, the vertical posts 222 are received within the mating posts 314 to provide a telescoping relationship for reasons which will be explained below.

Figure 1:
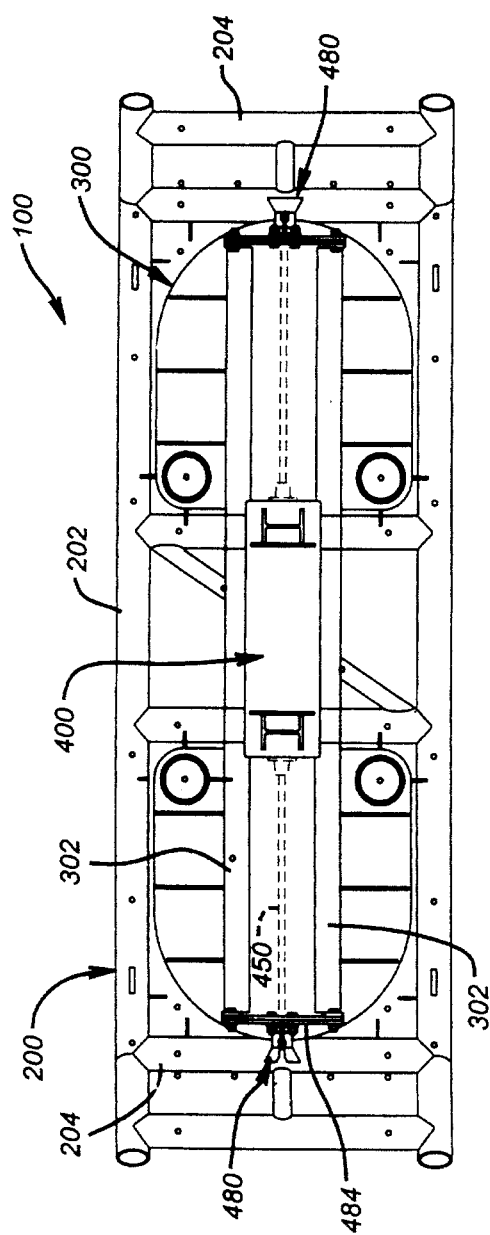
FIG. 1 is a top plan view of the pipe support frame according to the present invention.

Referring to FIGS. 10, 11, 12, and 13, the pipe saddle assembly and trolley arrangement 400 will be explained in detail. As shown in FIGS. 1 and 13, the pipe saddle and trolley arrangement 400 is installed between the pair of longitudinal beams 302. The trolley arrangement, designated generally as 410, includes a trolley beam 412 having a pair of flanges 412a and a web 412b. In the preferred embodiment, the trolley beam 412 is a W shape as designated by AISC. The flanges 412a of a W shape are a constant thickness. A top plate 414 is welded to an end of the flanges 412a.

Referring to FIGS. 10 and 13, the trolley beam 412 includes a plurality of holes 416 extending through the flanges 412a below the web 412b. A plurality of tapered wheels 418 rotatably mounted on shafts 420 are attached to the trolley beam 412 with nuts 422 as shown in FIG. 13. The taper of the wheels 418 corresponds to the taper of the flange 302a of the parallel beams 302. A plurality of upper rollers 424 are rotatably mounted to the outer surface of the flanges 412a. The rollers 424 are mounted so that the outer peripheral surface of the rollers 424 are aligned with the tapered surface of the flanges 302a.

Referring to FIG. 10, the trolley beam 412 has a drive end 426 and a trail end 428. A drive plate 430 is attached, preferably by welding, to the drive end 426 of the trolley beam 412. The drive plate 430 includes a threaded opening 432 (FIG. 12) which threadably engages a threaded portion of a drive rod 450 as shown in FIG. 1. A trail plate 440 is similarly welded to the trail end 428 of the trolley beam 412. The trail plate 440 includes an enlarged opening 442 in alignment with the threaded opening 432 of the drive plate 430. The drive rod 450 extends through the threaded opening 432 below the top plate 414 and through the enlarged opening 442.

The saddle arrangement, designated generally as 460, includes a pair of saddle supports 462 preferably made from a W shape structural member. The top plate 414 includes a pair of saddle support profiles (not shown) slightly greater than the size of the saddle supports 462 through which the saddle supports 462 can be inserted until a lower end 464 of the saddle support 462 abuts the web 412*b* of the trolley beam 412 as shown in FIG. 13. Referring to FIG. 13, the lower end 464 of the saddle support 462 includes a notched portion 466 through the web 462*b* through which the drive rod 450 is allowed to unobstructedly pass. The lower end 464 of the flanges 462*a* of the saddle supports 462 are chamfered to facilitate the insertion of the saddle supports 462 into the saddle support profiles. The saddle supports 462 are vertically removable for reasons which will be explained below. The upper end 468 of the saddle supports 462 have a pipe plate 470 welded to the flanges 462*a* of the saddle support 462. The upper end 468 of the saddle supports 462 includes an elongated opening 472 extending through the web 462*b* for the purpose of providing a grip point for the ROV manipulator.

Figure 14:
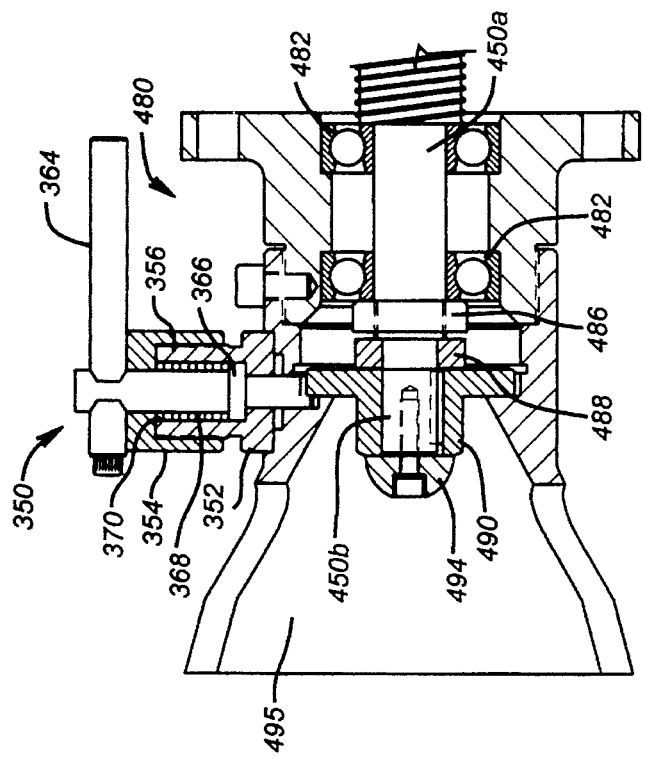
FIG. 14 is a cross-sectional view of a stabbing cone and lock housing assembly rotatably supporting a drive rod.
Figure 16:
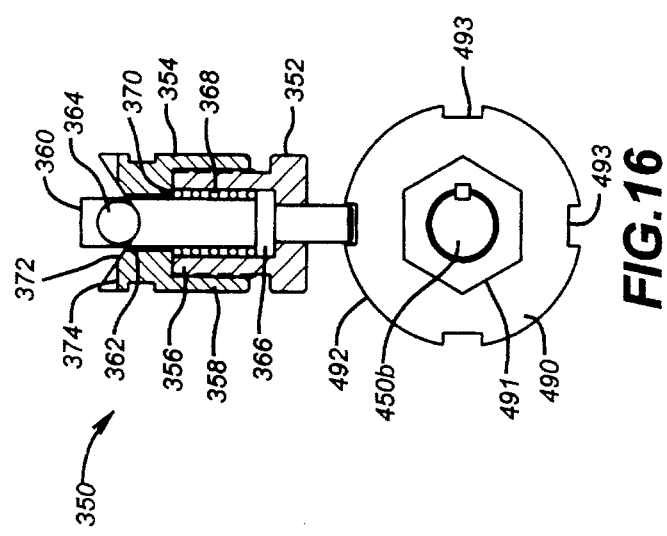
FIG. 16 is an elevational cross-sectional view of the lock in the locked position.

Referring to FIG. 1, the drive rod 450 is rotatably supported at each of its ends by a housing assembly 480. Referring to FIG. 14, the housing assembly 480 includes a pair of seated ball bearings 482 having an internal diameter corresponding to a smooth portion 450*a* of the drive rod 450. Referring to FIG. 1, the housing 480 is bolted to a drive rod bracket 484 which is connected to the end plates 306 attached to the ends of the parallel beams 302. Referring to FIG. 14, the outer ball bearing 482 is held in place with a bearing nut 486. The outermost end 450*b* of the drive rod 450 receives a drive rod sleeve 488 and a sliding nut 490. Referring to FIGS. 14 and 16, in the preferred embodiment the sliding nut 490 and the drive rod end 450*b* are connected via a key and keyway connection. It is to be understood that other types of connections can also be used. A sliding nut retainer 494 is mounted to the end of the drive rod 450 with a bolted connection. A slotted receptacle 495 is mounted to the housing assembly 480 for reasons which will be explained below.

The sliding nut 490 includes a hexagonal-shaped end portion 491 attached to a circular disk 492. As shown in FIG. 16, the circular disk 492 has a plurality of notches 493 around the perimeter.

Figure 17:
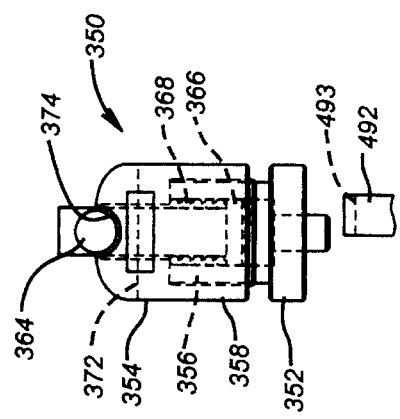
FIG. 17 is an elevational view of the lock in the unlocked position.

Referring to FIGS. 14, 16, and 17, a plunger assembly 350 is mounted to the slotted receptacle 495. The plunger assembly 350 includes an inner housing 352 and an outer housing 354. The inner housing 352 has an upper portion 356 which is received inside a lower portion 358 of the outer housing 354. A plunger rod 360 extends through a central passageway 362 in the inner and outer housings 352 and 354, respectively. The plunger rod 360 includes a handle 364 attached at the upper end of the plunger rod 360. The plunger rod 360 includes a flange 366. A compression spring 368 is located around the plunger rod 360 above the flange 366. The upper end of the compression spring 368 abuts an interior surface 370 of the outer housing 354 while the lower end of the compression spring 368 abuts the flange 366.

Referring to FIGS. 14 and 16, the plunger assembly 350 is shown engaging a notch 493 of the circular disk 492. In the engaged position the compression spring 368 forces the lower surface of the flange 366 into abutting contact with the inner housing 352. As best illustrated in FIG. 16, the handle 364 rests in a low cradle 372 when the plunger rod 360 is in the engaged position. The plunger rod 360 is disengaged by rotating the handle 364 approximately 90° which causes the plunger rod 360 to be raised as the handle 364 climbs up the low cradle 372 until coming to rest in an upper cradle 374 as shown in FIG. 17.

Figure 22:
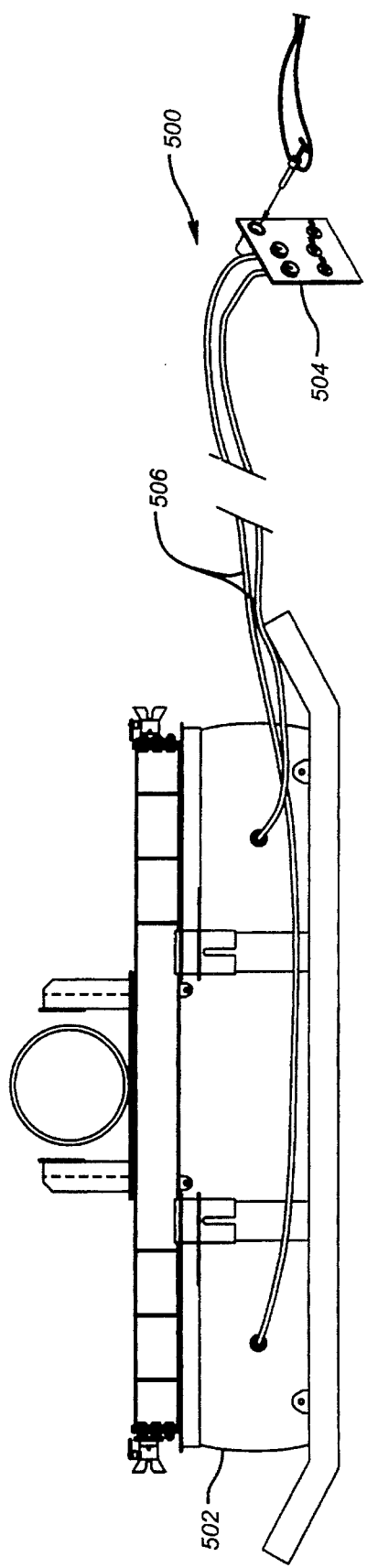
FIG. 22 is a side elevation view of a pipe support frame with inflated jacking bags while supporting the pipeline.

Referring to FIGS. 2 and 22, the pipe lifting assembly 500 includes, in the preferred embodiment, a pair of inflation bags 502 which are positioned between the lower skid 200 and the upper skid 300 within the cylindrical skirts 220 and 320. As shown in FIG. 22, a manifold panel 504 is connected by hoses 506 to the inflation bags 502. Although not shown in detail, the manifold panel 504 includes valving and controls typical in the industry for the pressurizing and depressurizing of the inflation bags 502.

OPERATION OF THE PRESENT INVENTION

As discussed above, the pipe support frame 100 is used to support a subsea pipeline a reasonable distance of 3–5 feet above the seabed and allows elevational positioning of the pipeline through a continuous adjustment range between a lowermost elevation and an uppermost elevation and lateral positioning of the pipeline during repair operations at the seafloor.

A detailed description of the complete operation for repairing the subsea pipeline at the seafloor can be found in Applicant's copending application "METHOD FOR REPAIRING A SUBMERGED PIPELINE" filed of even date herewith. Applicant hereby incorporates by reference the above entitled application.

Figure 18:
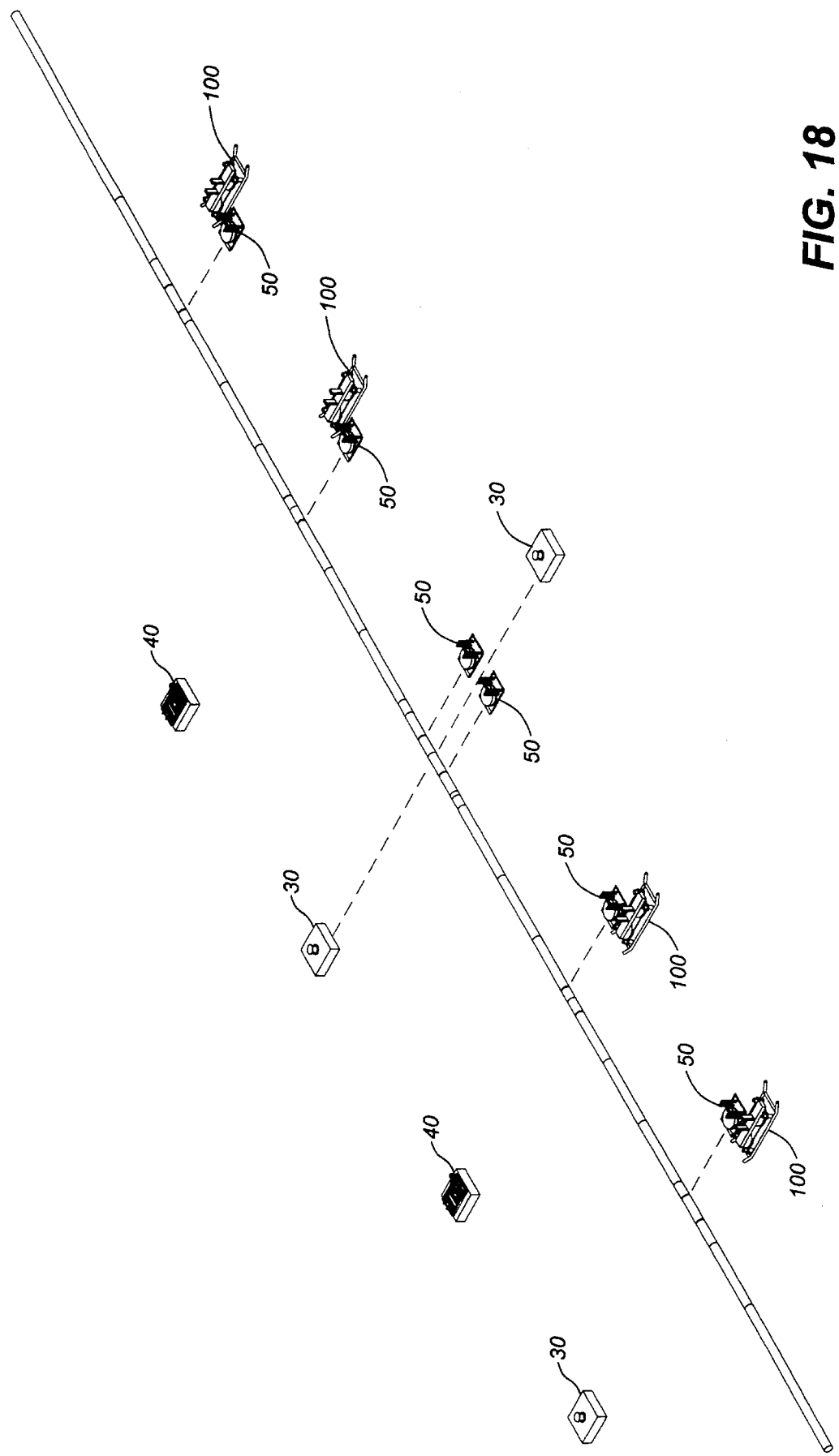
FIG. 18 is a diagrammatic view of a subsea pipeline with deployed bollard clump weights, winch clump weights, jacking bag assemblies, and pipe support frames.

FIG. 18 is a diagrammatic view of a subsea pipeline with deployed bollard clump weights 30, winch clump weights 40, jacking bag assemblies 50, and pipe support frames 100. The ROV aligns the deployed equipment into their assigned positions on the seabed as shown in FIG. 18. As shown in FIG. 18, four pipe support frames 100 are typically used in the pipeline repair operation.

Figure 19:
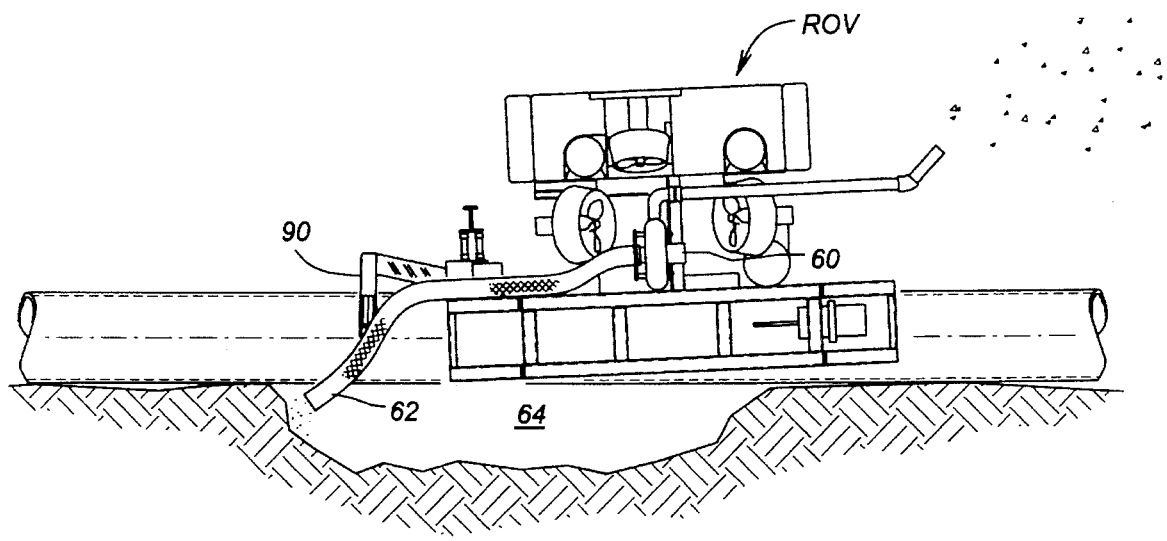
FIG. 19 is a side elevation view of the dredge package mounted to the ROV during the dredging operation.

With the equipment in their assigned positions as shown in FIG. 18, the dredging operation is commenced. A dredge package 60 as shown in FIG. 19, commonly used in the field with an ROV, is mounted to the ROV on the deck of the vessel (not shown). The ROV is deployed and swims to the installation position for a jacking bag assembly 50. A nozzle 62 of the dredge package 60 is placed adjacent to the pipe using the ROV manipulator 90. The dredge 60 is activated, as shown in FIG. 19, and the nozzle 62 is maneuvered with the ROV manipulator 90 to allow selective dredging to take place. The dredging is continued until it is visually observed that a pocket 64 of sufficient size has been excavated beneath the pipeline. The depth of excavation of the pocket 64 is gauged via the ROV manipulator 90. Similar pockets 64 are excavated at the other locations beneath the pipeline and adjacent to the properly positioned jacking bag assemblies 50.

Figure 20:
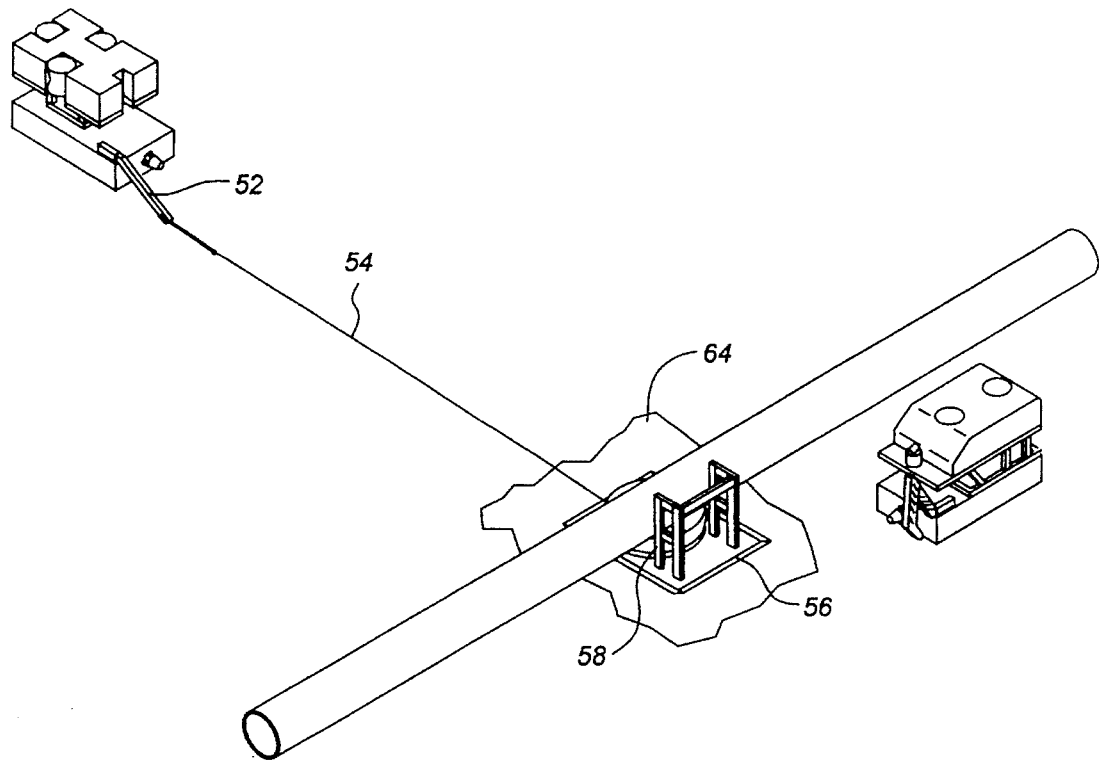
FIG. 20 is a diagrammatic view of the installation of a jacking bag assembly beneath the pipeline.

After dredging the pockets 64, the ROV swims to the jacking bag assembly 50 and releases a rod section 52 and pulling rope 54 from a jacking bag base member 56. The ROV passes the rod section 52 of the pulling rope 54 under the pipeline. The ROV releases the rod section 52 and relocates itself to the other side of the pipeline, where it retrieves the rod section 52 with its manipulator 90. Referring to FIG. 20, the ROV swims away from the pipeline, pulling the jacking bag assembly 50 under the pipeline and into the pocket 64. The ROV halts when a guide frame 58 of the jacking bag assembly 50 is firmly against the pipeline as shown in FIG. 20. The same steps are repeated for each of the jacking bag assemblies 50. The jacking bag assemblies 50 are inflated by the ROV to raise the pipeline approximately 1 meter off the seabed.

Figure 21:
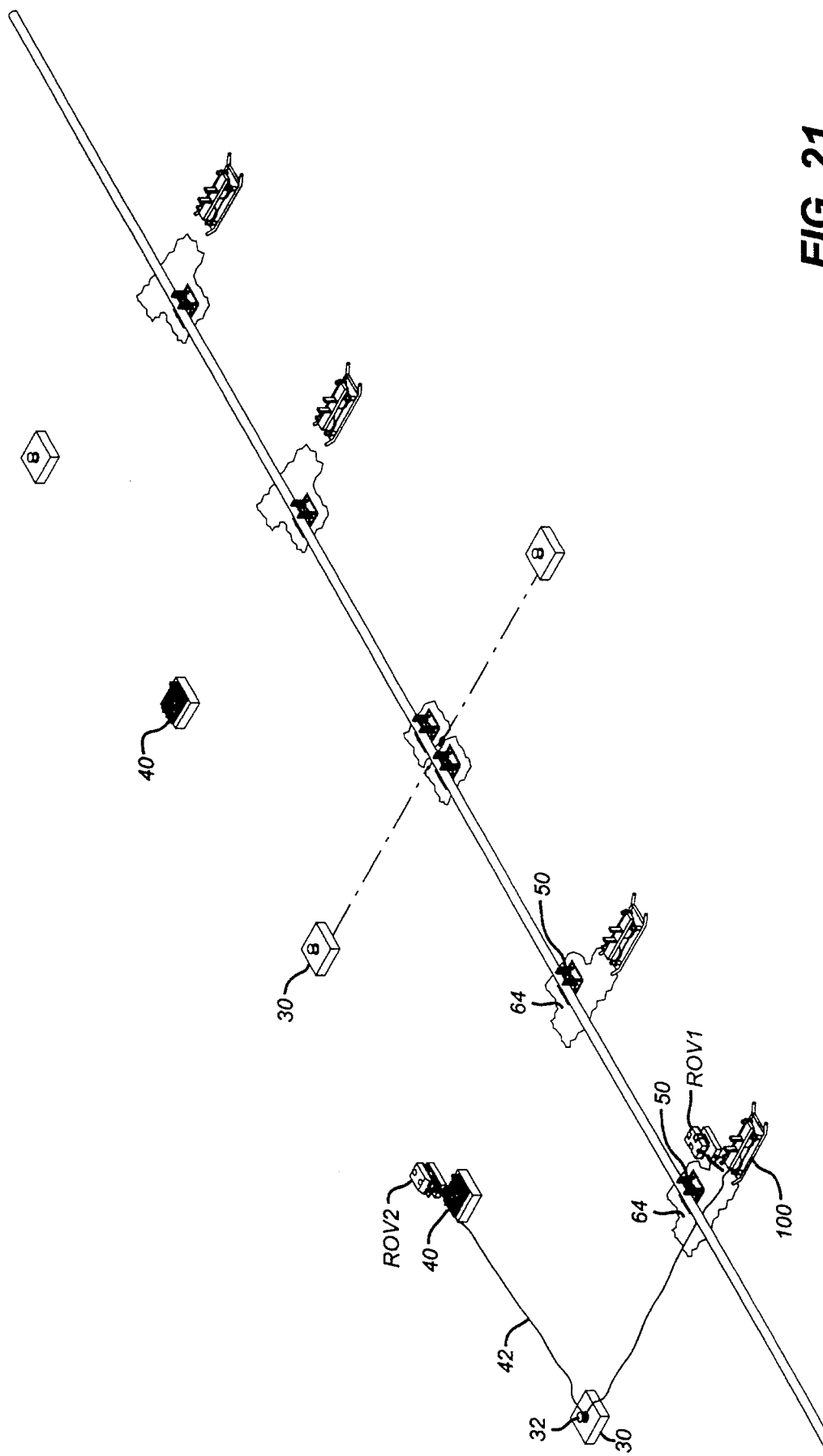
FIG. 21 is a diagrammatic view of a pipe support frame being pulled into position under the pipeline.

Referring to FIG. 21, the pipe support frames 100 are then installed under the pipeline in the following manner. A second ROV, ROV2, operates a winch (not shown) on the winch clump weight 40 to pay out a winch cable 42 while the first ROV, ROV1, runs the cable 42 around a bollard 32 of the bollard clump weight 30 and then to the pipeline. ROV1 passes a rod section (not shown) of the winch cable 42 under the pipeline using its manipulator 90. ROV1 swims to the other side of the pipeline and retrieves the rod section. ROV1 moves to the pipe support frame 100 and attaches the winch cable 42 to the pulling hook 236 (FIG. 6) on the pipe support frame 100. ROV1 surveys the cable run to ensure that the cable 42 is properly located around the bollard 32 and not snagged. ROV1 removes the saddle support 462 of the saddle arrangement 460 (FIG. 10) nearest the pipeline to accept the pipeline. Referring to FIG. 21, ROV2 operates the winch to haul in the cable 42 while ROV1 observes the pulling of the pipe support frame 100. The winch is stopped when the saddle support 462 on the trolley arrangement 410 of the pipe support frame 100 contacts the pipeline. ROV1 inserts the second saddle support 462 in the profile in the trolley beam 412 or engages the trolley 410 until the saddle support 462 can be vertically inserted in the saddle support profile. Payout of the cable 42 from the winch allows ROV1 to remove the cable pulling eye (not shown) from the hook 236 of the pipe support frame 100. Once released, ROV1 releases the cable 42 and ROV2 hauls the cable 42 in on the winch. The same procedure is involved for pulling in other pipe support frames 100 under the pipeline although the bollard 32 is not required when the winch can directly pull the pipe support frame 100 under the pipeline.

ROV1 and ROV2 each engage a water stab in the manifold 504 of the innermost pipe support frames 100. A water pump (not shown) on the ROV's are operated to inflate the inflation bags 502 to their maximum height to give an under pipe clearance of approximately 1200 millimeters from the seabed. Once this height is reached, the valving is closed. ROV1 and ROV2 then relocate to the outermost pipe support frames 100 where the respective inflation bags 502 are inflated to give an under pipe clearance of approximately 900 millimeters from the seabed, at which time the valving is closed.

The damaged section of the pipeline is then removed from between the two innermost pipe support frames 100. The remaining pipe ends may be misaligned after the removal of the damaged section of the pipeline. If the pipe ends are vertically misaligned, the inflation bags 502 are either further inflated or vented until the ends are properly aligned.

Figure 15:
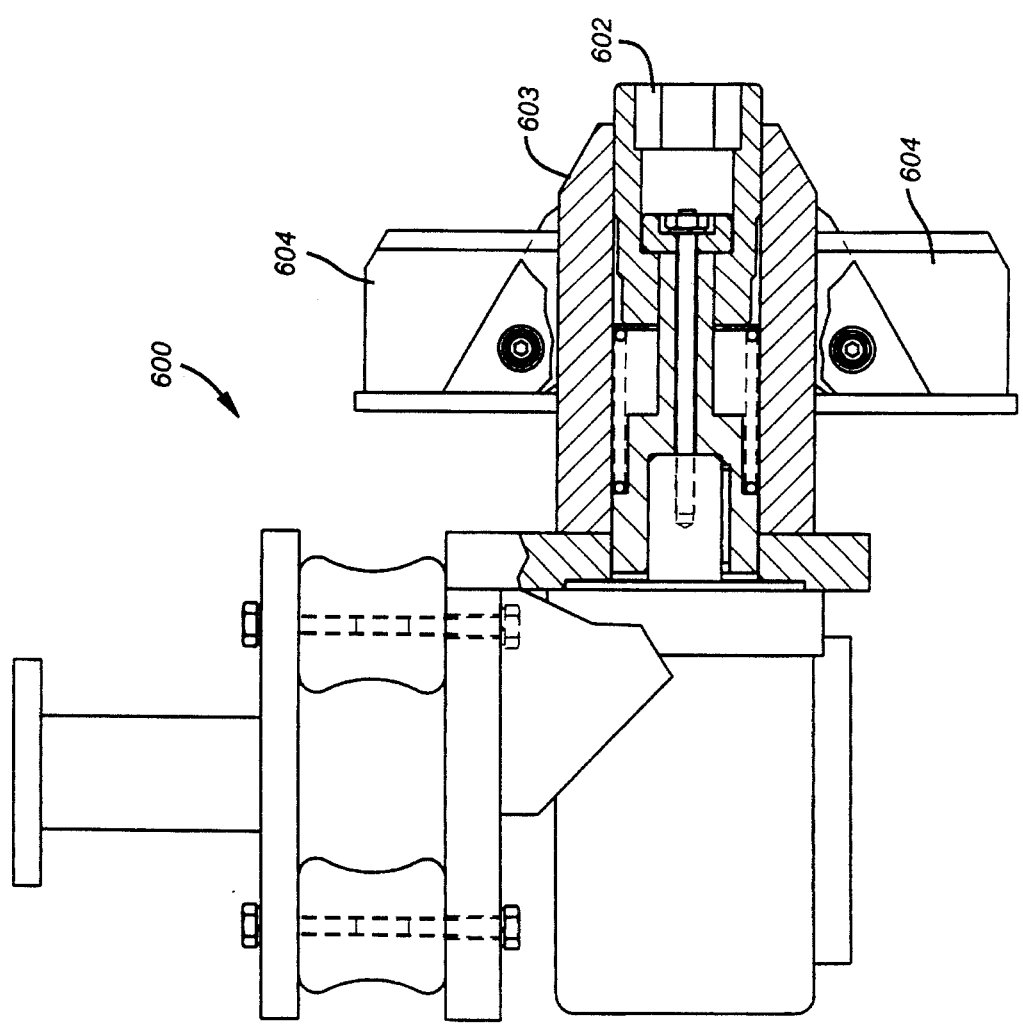
FIG. 15 is a partial sectional view of a torque tool.

If the pipe ends are laterally misaligned, the ROV takes a torque tool 600 (FIG. 15) having a hexagonal-shaped socket 602 corresponding to hexagonal-shaped end portion 491 of the sliding nut 490. The torque tool 600 includes a nose portion 603 and a pair of fins 604. The nose portion 603 is guided by the receptacle 495 to facilitate the connection of the socket 602 with the sliding nut 490. The fins 604 fit into the slots of the slotted receptacle 495 to prevent the torque tool 600 from rotating as the socket 602 rotates the sliding nut 490 and the drive rod 450. Preferably, the torque tool is hydraulically powered by the ROV. With the plunger rod 360 in the disengaged position (FIG. 17), the torque tool 600 is connected to the sliding nut 490. The hydraulically powered torque tool 600 drives the drive rod 450 via the sliding nut 490 which causes the pipe saddle assembly and trolley arrangement 400 to laterally move the pipe. After the proper position has been achieved, the plunger rod 360 is engaged in a notch 493 to lock the lateral position of the pipe.

After the repair has been made to the pipeline, the pipe support frames 100 are removed by venting the inflation bags 502 and removing a saddle support 462 from the trolley beam 412. The pipe support frames 100 are pulled out from beneath the pipeline which is still supported by the jacking bags 50. The remainder of the equipment is retrieved following basically the same steps in reverse order.

The foregoing disclosure and description of the invention are illustrative and explanatory thereof, and various changes in the size, shape, and materials, as well as in the details of the illustrated construction, may be made without departing from the spirit of the invention.

What is claimed is:

1. A pipe support frame for positioning a subsea pipeline, comprising:

a skid assembly including a lower skid and an upper skid;

means for receiving the pipeline mounted above said upper skid;

means for altering the elevation of said upper skid through a continuous adjustment range between a lowermost elevation and an uppermost elevation while the pipeline is supported on said upper skid; and means for adjusting the lateral position of the pipeline.

2. A pipe support frame for positioning a subsea pipeline, comprising:

a skid assembly having a lower skid and an upper skid;

means for receiving the pipeline mounted to said upper skid;

means for altering the elevation of the pipeline comprising a plurality of water jacking bags positioned between said upper and lower skids;

means for adjusting the lateral position of the pipeline, said means for adjusting connected to said receiving means; and means for maintaining vertical alignment of said upper skid with respect to said lower skid, wherein said means for maintaining vertical alignment comprises:

a plurality of vertical lower skid members connected to said lower skid; and a plurality of mating vertical upper skid members connected to said upper skid, wherein said plurality of mating vertical upper skid members slidably engage with said plurality of vertical lower skid members.

3. A pipe support frame for positioning a subsea pipeline, comprising:

a skid assembly having a pair of longitudinal parallel beams;

means for receiving the pipeline mounted to said pair of parallel beams;

means for altering the elevation of the pipeline, said means for altering attached to said skid assembly; and means for adjusting the lateral position of the pipeline, wherein said means for adjusting the lateral position comprises a trolley assembly movably mounted to said pair of parallel beams.

4. The pipe support frame according to claim 3, wherein said trolley assembly comprises:

a trolley member; and a plurality of rollers mounted to said trolley member, wherein said plurality of rollers interact with said parallel beams and maintain said trolley member in alignment with said parallel beams.

5. The pipe support frame according to claim 4, wherein said means for adjusting the lateral position further comprises:

a drive rod;

means for mounting said drive rod to said skid assembly; and means for engaging said trolley assembly with said drive rod, wherein the lateral position of said trolley assembly is controllable by manipulating said drive rod.

6. The pipe support frame according to claim 5, wherein said drive rod is threaded and said trolley assembly is threadably engaged with said drive rod such that the lateral position of said trolley assembly is controllable by rotating said drive rod.

7. The pipe support frame according to claim 6, further comprising means for locking said lateral position of the pipeline relative to said skid assembly.

8. A pipe support frame for positioning a subsea pipeline, comprising:

a generally horizontal lower skid;

a generally horizontal upper skid above said lower skid, said upper skid capable of moving vertically relative to said lower skid;

means for maintaining vertical alignment of said upper skid with respect to said lower skid;

means for receiving the pipeline mounted above said upper skid;

means for altering the elevation of said receiving means through a continuous adjustment range between a lowermost elevation and an uppermost elevation while the pipeline is supported on said receiving means, said means for altering attached to said upper skid; and means for adjusting the lateral position of the pipeline, said means for adjusting connected to said receiving means.

9. The pipe support frame according to claim 8, wherein said means for altering the elevation comprises a plurality of water jacking bags positioned between said upper and lower skids.

10. The pipe support frame according to claim 8, further comprising means for locking said lateral position of the pipeline relative to said upper skid.

11. A pipe support frame for positioning a subsea pipeline, comprising:

a lower skid;

an upper skid having a pair of longitudinal parallel beams;

means for maintaining vertical alignment of said upper skid with respect to said lower skid;

means for altering the elevation of the pipeline, said means for altering attached to said upper skid;

means for receiving the pipeline mounted to said upper skid; and means for adjusting the lateral position of the pipeline, wherein said means for adjusting the lateral position comprises a trolley assembly movably mounted to said pair of parallel beams.

12. The pipe support frame according to claim 11, wherein said trolley assembly comprises:

a trolley member; and a plurality of rollers mounted to said trolley member, wherein said plurality of rollers interact with said parallel beams and maintain said trolley member in alignment with said parallel beams.

13. The pipe support frame according to claim 12, wherein said means for adjusting the lateral position further comprises:

a drive rod;

means for mounting said drive rod to said upper skid; and means for engaging said trolley assembly with said drive rod, wherein the lateral position of said trolley assembly is controllable by manipulating said drive rod.

14. The pipe support frame according to claim 13, wherein said drive rod is threaded and said trolley assembly is threadably engaged with said drive rod such that the lateral position of said trolley assembly is controllable by rotating said drive rod.

15. A pipe support frame for positioning a subsea pipeline, comprising:

a lower skid having a plurality of vertical lower skid members;

an upper skid having a plurality of mating vertical upper skid members which slidably engage with said plurality of vertical lower skid members and maintain vertical alignment of said upper skid with respect to said lower skid;

means for altering the elevation of the pipeline comprising a plurality of water jacking bags positioned between said upper and lower skids;

means for receiving the pipeline mounted to said upper skid; and means for adjusting the lateral position of the pipeline, said means for adjusting connected to said receiving means.

16. A pipe support frame for positioning a subsea pipeline, comprising:

a skid assembly including a lower skid and an upper skid;

means for receiving the pipeline mounted above said upper skid;

means for altering the elevation of said upper skid comprising a water jacking bag integrated in said skid assembly between said lower and upper skids; and means for adjusting the lateral position of the pipeline.

17. A pipe support frame for positioning a subsea pipeline, comprising:

a skid assembly including a lower skid and an upper skid;

means for receiving the pipeline mounted above said upper skid;

means for altering the elevation of said upper skid comprising a plurality of water jacking bags positioned between said upper and lower skids; and means for adjusting the lateral position of the pipeline.

18. The pipe support frame according to claim 17, wherein said skid assembly includes means for maintaining vertical alignment of said upper skid with respect to said lower skid.

* * * * *